ns states Patent Office 2,768,080
Patented Oct. 23, 1956

2,768,080

HYDROPHILIC HIGH POLYMER HYDROSOLS AND GELATINE EMULSIONS

Richard J. Hellmann and William F. Fowler, Jr., Rochester, N. Y., assignors to Eastman Kodak Company, Rochester, N. Y., a corporation of New Jersey No Drawing. Application February 18, 1954, Serial No. 411,268

4 Claims. (Cl. 95—7)

This invention concerns high polymer hydrophilic hydrosols, more particularly copolymer hydrosols containing a 2-alkoxyethyl acrylate, acrylonitrile and an unsaturated acid.

Various hydrosols have been formed in the past by the polymerization of highly hydrophobic monomers such as styrene and butadiene used in synthetic rubber and vinyl chloride and vinylidene chloride used in other types of plastics. However, these hydrosols are insoluble in water and the addition of a portion of hydrophilic monomer does not permit transformation of such hydrosols into solutions. In some instances, efforts have been made to form hydrosols from acrylic acid, and related compositions which may be transformed to solutions by raising the pH to neutrality or slightly above. In these instances it has been necessary to raise the amount of acrylic acid in the copolymer to a large amount with the result that if such solutions are mixed with gelatin solutions and coated, the resultant films are brittle.

In the photographic industry there has been a particular need for gelatin extenders and substitutes, inasmuch as gelatin of photographic purity is in considerable demand, expensive and not always of certain supply. However, any material which can be mixed with gelatin in most cases should also have at least as good properties as gelatin and should, if possible, improve certain characteristics. For example, these extenders preferably should increase the flexibility of gelatin coatings, should be compatible with photographic emulsions, should form clear solutions and films, and should be free from desensitizing effects. Moreover, these hydrosols usually should be transformable into truly hydrophilic copolymers by raising the pH without impairing markedly the flexibility such hydrosols impart to gelatin copolymer coatings. We have also found that coatings having these characteristics can also be used in other applications such as coatings for paper, fabric and the like.

One object of our invention is to provide a polymeric composition which is useful for incorporating in gelatin compositions for the purpose of improving the properties of the gelatin and extending its usefulness. Another object of our invention is to provide a method for preparing polymers in the form of an aqueous dispersion of good physical characteristics. A further object of our invention is to provide a method for copolymerizing acrylic acid, acrylonitrile and a 2-alkoxyethyl acrylate so as to obtain a hydrosol of that polymer which readily lends itself to mixing with water solutions of other colloidal materials. A still further object of our invention is to provide a method for preparing hydrophilic polymers which may be transformed to clear, viscous solutions by raising the pH to neutrality or slightly above. Other objects of our invention will appear herein.

We have found that in order to provide a hydrosol having desirable properties as a gelatin extender or substitute that it is necessary to use monomers having extremely critical properties. This is necessary in order to have a hydrosol which will go into the solution in photographic applications, especially when mixed with a solution of gelatin or other water soluble colloid with which it is to be used and a light sensitive silver halide salt. Our process involves the use of:

1. An unsaturated organic acid having the following structural formula:

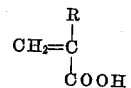

in which R may be hydrogen or an alkyl group having from 1 to 3 carbon atoms.

2. Acrylonitrile having the structural formula:

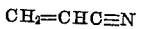

3. A 2-alkoxyethyl acrylate having the following structural formula:

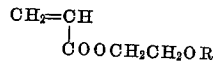

where R may be an alkyl group having from 1 to 4 carbon atoms.

In compounding the hydrosols in accordance with our invention, the three monomers are added to heated water in which has been dissolved a suitable detergent such as sodium lauryl sulfate (Duponol–ME) and a catalyst such as potassium persulfate or the like. After maintaining the reaction mixture until polymerization has taken place, a hydrosol is formed. These hydrosols may be dissolved by raising the pH with dilute aqueous ammonia. At about pH 6 a clear, viscous solution is formed which may be mixed with gelatin in solution. Various other proteinaceous materials other than gelatin may be used and mixed with these hydrosols as such or in solution. These include proteins such as maleated zein, maleated glue, methacrylated gelatin and the like. The following proportions are operative for the purposes described herein:

1. Acrylic acid 2 to 16 weight percent.
2. Acrylonitrile 14 to 63 weight percent.
3. 2-alkoxyethyl acrylate 35 to 70 weight percent.

The 2-alkoxyethyl acrylate esters include 2-methoxy, 2-ethoxy, 2-propoxy and 2-butoxy ethyl acrylate esters. The acrylic acid may be substituted by methacrylic acid, itaconic acid, and the like. However, the preferred embodiment incorporates acrylic acid. Certain other esters may be substituted for the 2-alkoxyethyl acrylate such as 2-alkoxy methacrylates, 2-(2-alkoxy)alkoxy acrylates and methacrylates, acetate-acrylate esters of diethylene or triethylene glycol, methoxymethoxyethyl acrylate, and the like.

In dispersing the monomers in water it is preferred to use an anionic surface-active agent such as sodium lauryl sulfate. Other dispersing agents, however, such as (1) sodium stearate, (2) sulfonates of octyl phenoxy polyethyleneglycol, (3) sodium salts of alkyl aryl sulfonates, (4) sodium salts of alkyl naphthalene sulfonates and (5) sodium salts of sulfated monoglycerides. Also it is preferred to incorporate in the dispersion a catalyst adapted to promote the polymerization of the monomers. Either of two methods of polymerization may be used: (1) heating on a steam bath or (2) carrying out at substantially room temperature (15–30° C.). Where a steam bath polymerization is employed, a water-soluble per-compound may be employed as the catalyst, as, for example, ammonium persulfate, potassium persulfate, hydrogen peroxide, sodium perborate, sodium peracetic acid or the like. If, on the other hand, the polymerization of the monomer dispersion is carried out at room temperature, a redox system catalyst is employed, such as a mixture of sodium acid sulfite and ammonium persulfate or some other per-compound, a mixture of ascorbic acid and a per-compound or a mixture of a ferrous ion compound and a per-compound, or any other redox system catalyst which has been described as being suitable for promoting the polymerization of monomers. It is desirable to carry out the polymerization, that the mass be vigorously agitated, and that the monomers be added over a short period.

The following examples illustrate but are not intended to unduly restrict our invention:

*Example 1.—Copolymerization of 2-methoxyethyl acrylate, acrylonitrile, and acrylic acid*

A solution of 2.5 grams of sodium lauryl sulfate (Duponol–ME) in 800 ml. of distilled water was heated on a steam bath to 80° C. in a 2-liter 3-necked flask equipped with two dropping funnels and a mechanical stirrer. Then 1.27 grams of potassium persulfate were added. To this solution were then added simultaneously, while stirring at 80° C. dropwise over a 40 minute period the contents of the two dropping funnels, one containing 20 grams of acrylic acid, 164 grams of 2-methoxyethyl acrylate, and 70 grams of acrylonitrile, the other having in it a solution of 2.5 grams more of sodium lauryl sulfate in 200 ml. of distilled water. The reaction mixture was maintained at 80° C. for 15 minutes after the addition of the reactants, then cooled to room temperature. An opaque hydrosol resulted which had a pH of 2.8.

A 100 ml. sample of this hydrosol was diluted with 300 ml. of distilled water and the pH raised to 7.0 with dilute aqueous ammonia. At about pH 6 a clear, viscous solution formed. This material is compatible with gelatin in solution or dried down to a film after mixing in as high as a 1:1 ratio (solids weight) with the gelatin.

*Example 2.—Copolymerization of 2-ethoxyethyl acrylate, acrylonitrile, and acrylic acid*

An extensive series of copolymerizations were run by the method given in Example 1. The ratio of monomers was varied; each sample was then tested for solubility at high pH as indicated in Table I.

TABLE I.—2-ETHOXYETHYL ACRYLATE-ACRYLONITRILE ACRYLIC ACID COPOLYMERIZATIONS

| Grams Ester | Grams Nitrile | Grams Acid | Appearance at pH 7 |
|---|---|---|---|
| 171 | 73 | 10 | Translucent sol. |
| 122 | 122 | 10 | Opaque sol. |
| 73 | 171 | 10 | Do. |
| 164 | 70 | 20 | Transparent solution. |
| 117 | 117 | 20 | Translucent sol. |
| 70 | 164 | 20 | Opaque sol. |
| 157 | 67 | 30 | Transparent solution. |
| 112 | 112 | 30 | Transparent, extremely viscous solution. |
| 67 | 157 | 30 | Opaque sol. |
| 234 | None | 20 | Transparent solution. |
| None | 234 | 20 | Coagulated during polymerization. |
| 87 | 87 | 60 | Transparent solution. |
| 127 | 127 | None | Opaque sol. |
| 129 | 105 | 30 | Transparent, extremely viscous solution. |
| 107 | 107 | 40 | Do. |
| 101 | 123 | 30 | Do. |

From Table I it is apparent that the ratio of the three monomers determines the ultimate hydrophilic character of the neutralized sols. The following conditions must be met in emulsion copolymerization of these three monomers in order to obtain a transparent solution on elevating the pH:

(a) At least 8 percent of acrylic acid must be used
(b) At least 50 percent of the weight of the other two monomers must be ester, unless the acid level is as high as 12 percent when only 45 percent of the other two monomers must be ester.

All of these samples adjusted to pH 7 are compatible with gelatin at 1:1 ratio.

*Example 3.—Copolymerization of 2-butoxyethyl acrylate, acrylonitrile, and acrylic acid*

This copolymer was prepared exactly as that described in Example 1 except that 2-butoxyethyl acrylate was substituted for 2-methoxyethyl acrylate. On raising a 5 percent sample of hydrosol to pH 7, a somewhat viscous, bluish-haze sol resulted which was compatible with gelatin.

*Example 4.—Copolymerization of tetrahydrofurfuryl acrylate, acrylonitrile, and acrylic acid*

This copolymer was prepared exactly as that described in Example 1 except the following monomer combination was employed:

10 grams acrylic acid
171 grams tetrahydrofurfuryl acrylate
73 grams acrylonitrile The resultant hydrosol was diluted to 5 percent concentration, adjusted to pH 7 at which a somewhat viscous, bluish, hazy solution formed, mixed 1:1 with gelatin, and dried to produce a clear film.

Compositions described in this invention are useful for applications wherein gelatin has been previously used. They may be used as coatings on cellulose sheeting and fabrics, textiles of all types, and on paper especially for photographic purposes.

We claim:

1. A photographic element comprising a polymeric material formed by polymerizing in aqueous dispersion to form a hydrosol, at least 8% of acrylic acid, at least 50% of a 2-alkoxyethyl acrylate selected from the class consisting of methoxy, ethoxy, propoxy, butoxy, and methoxymethoxy ethyl acrylates and at least 14% acrylonitrile, gelatin and light-sensitive silver halide salts.

2. A photographic element according to claim 1 in which the hydrosol has been adjusted to pH 7 and mixed with gelatin at approximately equal proportions by weight.

3. A photographic element comprising gelatin mixed with a relatively hydrophilic high polymer hydrosol containing at least 8% of acrylic acid, at least 50% of a 2-alkoxyethyl acrylate selected from the group consisting of methoxy, ethoxy, propoxy, butoxy, and methoxymethoxy ethyl acrylates and at least 14% acrylonitrile polymerized in an aqueous dispersion.

4. A process for providing a photographic emulsion comprising polymerizing in aqueous dispersion at least 8% acrylic acid, at least 50% of a 2-alkoxyethyl acrylate selected from the group consisting of methoxy, alkoxy, propoxy, butoxy and methoxymethoxy ethyl acrylates and at least 14% acrylonitrile at a temperature of about 80–120° C. and adding gelatin and light-sensitive silver halide salts.

References Cited in the file of this patent

UNITED STATES PATENTS

| | | |
|---|---|---|
| 1,981,102 | Hagedorn et al. | Nov. 20, 1934 |
| 2,006,002 | Schneider | June 25, 1935 |
| 2,133,257 | Strain | Oct. 11, 1938 |
| 2,436,926 | Jacobson | Mar. 2, 1948 |
| 2,446,049 | Kropa | July 27, 1948 |
| 2,486,241 | Arnold | Oct. 25, 1949 |